United States Patent [19]
Peynaud et al.

[11] 3,818,425
[45] June 18, 1974

[54] NAVIGATION SYSTEMS UTILISING THE DOPPLER EFFECT

[75] Inventors: Francois Peynaud; Gilles Posseme, both of Paris, France

[73] Assignee: Thomson-CSF, Paris, France

[22] Filed: Dec. 12, 1972

[21] Appl. No.: 314,471

[30] Foreign Application Priority Data
Dec. 17, 1971 France .............................. 71.45501

[52] U.S. Cl. ............... 340/3 R, 340/3 D, 340/3 PS, 340/8 D
[51] Int. Cl. .............................................. G01s 9/66
[58] Field of Search .......... 340/3 R, 3 D, 3 PS, 8 R, 340/8 L, 8 LF, 8 D, 8 S

[56] References Cited
UNITED STATES PATENTS
3,648,225  3/1972  Kritz .................................. 340/3 D

*Primary Examiner*—Richard A. Farley
*Attorney, Agent, or Firm*—Cushman, Darby & Cushman

[57] ABSTRACT

Doppler sonar navigation system, comprising an on-board acoustic waves transmit and receive sound transducer device; transmission and reception take place in a manner known per se in four directions with beams equally inclined in relation to the vertical and located in two mutually perpendicular planes, the receiving electro acoustic transducer elements being located upon the focal sphere of a spherical acoustic lens. The assembly is enclosed within a casing filled with a fluid medium having a known ultrasonic wave propagation velocity dependent on the fluid temperature, the latter being controllable. The sound transducers are directed towards casing base which is transparent to the ultrasonic waves. The casing is secured to the vessel hull and said base is in contact with supporting water.

The invention is applicable primarily to Doppler sonar, in particular for the measurement of the speed of a marine vessel independently of variations in the velocity of propagation of sound through water.

6 Claims, 2 Drawing Figures

NAVIGATION SYSTEMS UTILISING THE DOPPLER EFFECT

The present invention relates to improvements in or relating to navigation systems utilising the Doppler effect. These improvements relate more particularly to a novel acoustic transmit and receive sound transducer device implementing a conventional "Doppler sonar" intended primarily to determine the speed of a marine vessel in relation to the submerged surface which constitutes a stable reference point.

In order to determine the speed of displacement of a marine vessel in relation to the submerged surface of seabed, certain of the known on-board navigational systems, such as "Doppler-sonar," measure the "Doppler frequency," i.e. the difference between the frequency of an ultrasonic wave beam emitted in the direction of the submerged surface, at an angle $\alpha$ in relation to the vertical, generally ranging between 0° and 45°, and the frequency with which said same ultrasonic wave beam energy is received as reflected from the submerged surface discrete areas in particular along the reciprocal of the direction taken by the incident wave. The value of this Doppler frequency then depends upon the frequency $f_1$ of transmission, the velocity $c$ of the ultrasonic wave through the propagation medium, the inclination $\alpha$ of the transmit and the receive beams and a component V of the vessel speed.

In order to simultaneously measure the two coplanar, longitudinal and transverse components of this speed and reduce the influence of pitching and rolling movements of the vessel on the accuracy of this measurement, one method described in U.S. Pat. No 3 257 638, known as the "Janus method," consists in utilising two transmitted/received ultrasonic wave beams, likewise inclined at an angle $\alpha$ at either side of the vertical passing through the vessel and contained in the vertical plane passing through the longitudinal axis of the vessel, and two other identical beams contained in a vertical plane perpendicular to the first plane and themselves likewise inclined at the angle $\alpha$ in relation to the vertical. The difference $f$ between the wave frequencies received by the two beams contained in each of these receiving planes is equal to:

$$f = f_1 (4V/c) \sin \alpha$$

V being the component of the speed of the vessel in the plane in question, and $c$ the velocity.

The velocity $c$ of the ultrasonic wave in the propagation medium may vary very substantially, in particular in dependance of the temperature and salinity of the medium and may therefore have an acountable influence upon the accuracy of the final measurement.

Various methods make it possible to take account of these variations in velocity $c$. Thus, for example, the temperature of the propagation medium can be measured by means of a thermistor, and a correlated compensation of the measured velocity $c$ effected. However, this method does not take account of the variations due to the salinity of the medium.

Another method consists in measuring the velocity $c$ of the ultrasonic wave in the propagation medium, by means of a velocimeter, and correlatively compensating the measurement of the speed V of the vessel or again modifying the transmitted wave frequency $f_1$ accordingly. However, these methods are relatively complex and expensive.

Yet another known method as disclosed in French Patent 5 2 019 462 consists in compensating for the variations in the velocity $c$ by a correlated modification of the angle of the transmitted/received beams, that is to say in order to maintain the ratio (sin $\alpha/c$) at a constant value. This is equivalent to selecting an acoustic sound transducer device which is parallel to the direction of the speed being measured, whose phase law is independent of variations in the velocity $c$. Several devices of this kind have already been designed, consisting of a flat assembly of electroacoustic transducers.

An electronic system comprising delay lines or phaseshift elements supplies the various electroacoustic transducers of such an array, in order to form transmission beams and reception beams with an inclination $\alpha$ in relation to the vertical. It has been shown that this inclination depends upon the velocity $c$ of sound in the propagation medium and that it is merely necessary to maintain the phase law along the array constant, for the ratio (sin $\alpha/c$) to remain constant as $c$ varies.

One object of the present invention is to provide an acoustic transmit and receive sound transducer device embodiment, which makes needless the use of an electronic system in order to form transmission and reception beams and obtain a constant, linear phase law so that the measurement is independent of variations in the velocity of sound.

Another object of the invention is to reduce the dimensions of the acoustic sound transducer device arrangement, whilst improving its performance.

In accordance with one aspect of the present invention, the navigation system utilising the Doppler effect for water borne vessel, comprises, an on-board acoustic waves transmit and receive sound transducer device formed by a plurality of electroacoustic transducer elements associated in transmit-receive cooperating pairs, Doppler sonar electronic circuit means coupled to the transmit transducer elements for radiating acoustic wave energy beams toward water submerged bottom body and coupled to the receive transducer elements receiving said beams energy as reflected from the said bottom discrete areas for processing return signals to derive the vessel speed by Doppler frequency measurement, a fluid medium filled sealed casing with a base formed by an acoustic waves transparent diaphragm in contact with the vessel supporting water, said transmit elements and said receiving elements being located within said fluid filled casing with inclined beam axes oriented towards said diaphragm, and said fluid medium being selected with a waves propagation velocity of a known value as related to the fluid temperature, said velocity being modified by associated temperature control means located within said casing.

In accordance with another aspect of the invention, the said system sound transducer device comprises four transmit transducer elements arranged in a first horizontal plane each respectively at the corner of a square one of whose diagonals coincides with the longitudinal axis and the other with the transverse axis of the vessel and four receiver transducer elements, each functionaly associated with a respective transmitter element, are arranged in a similar configuration in a horizontal plane which may be coincidental with the first.

Other features and advantages of the present invention will become apparent during the course of the ensuing description, given by way of example and relating to the attached drawings in which.

Figure 1:
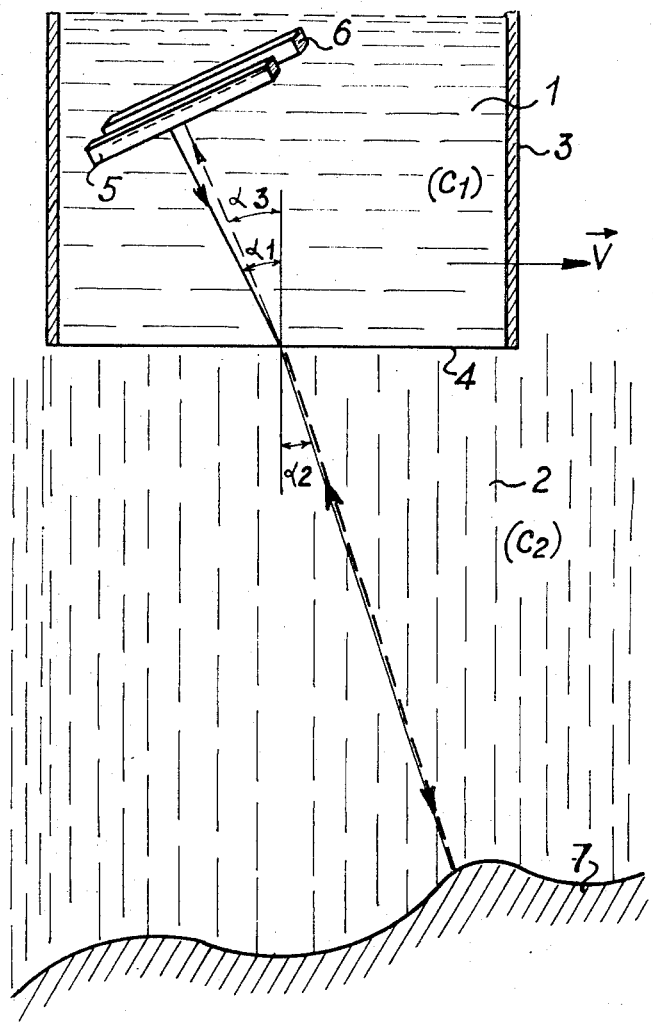
FIG. 1 is a drawing schematicaly illustrating a very simplified arrangement of an acoustic sound transducer device in accordance with the present invention, and the trajectory taken by the transmitted and received radiation.

FIG. 1 schematically illustrates the very simplified arrangement of an acoustic sound transducer device in accordance with the present invention, and shows the propagation paths of the transmitted and received radiation beams. This device comprises a casing 3 filled with a liquid medium 1 in which the the velocity of sound propagation in said medium, is equal to $c_1$ and in which there are immersed a transmitter element 5 and a receiver element 6 for ultrasonic waves, both inclined in relation to the vertical and constituted by electroacoustic transducers. The base 4 of this casing 3 is transparent to ultrasonic waves and will advantageously be parallel to the direction of the speed $\vec{V}$ of translational movement of the assembly of casing 3 and its contents. This translational movement takes place in relation to a medium 2 such as water in which the velocity is $c_2$. The direction of the emitted beam is inclined at an angle $\alpha_1$ in the medium 1, as far as an observer following the movement of the system constituted by the casing 3 is concerned, and at an angle $\alpha_2$ in the medium 2 for a static observer, these angles being related to the perpendicular to the surface 4 taken as reference. This emitted beam passes through the medium 2 and diffuses back from the submerged surface body 7 in a direction which is reciprocal of the incident direction, through the medium 2. Because of the motion of the medium 1 at the speed $\vec{V}$ in relation to the medium 2, the direction in which the returning reflected wave is received in the medium 1, is inclined as far as the moving observer is concerned, at an angle $\alpha_3$ in relation to the perpendicular to the base surface 4. Taking account of the modification experienced by the phase law of the ultrasonic waves each transit of the surface 4, the following relationships can be established:

$$f_2 = f_1 [1 + V (\sin \alpha_1/c_1)] \quad (1)$$

$$\frac{\sin \alpha_2}{c_2} = \frac{\sin \alpha_1}{c_1} \times \frac{1}{1 + V \frac{\sin \alpha_1}{c_1}} \quad (2)$$

$$f_3 = f_2 [1 + V (\sin \alpha_2/c_2)] = f_1 [1 + 2V (\sin \alpha_1/c_1)] \quad (3)$$

$$\frac{\sin \alpha_3}{c_1} = \frac{f_2}{f_3} \frac{\sin \alpha_2}{c_2} = \frac{f_1}{f_3} \frac{\sin \alpha_1}{c_1} = \frac{\sin \alpha_1}{c_1} \times \frac{1}{1 + 2V \frac{\sin \alpha_1}{c_1}} \quad (4)$$

in which: $f_1$ is the transmitted wave frequency; $f_2$ the frequency of the wave in the medium 2; $f_3$ the frequency of the received wave in the medium 1; $c_1, c_2$ the velocities of ultrasonic waves in their respective media; $\alpha_1, \alpha_2, \alpha_3$ the angles hereinbefore defined; and V the speed of the vessel.

In the case where two beams of ultrasonic waves which are symmetrical in relation to the perpendicular to the base surface 4 and likewise inclined at $\alpha_1$, are transmitted through the medium 1, the measured frequency difference is equal to $f = f_1 (4V/c_1) \sin \alpha_1$. The measurement of the speed V is thus made independent of variations in the velocity $c_2$ of propagation of ultrasonic waves through the medium 2.

By stabilising the velocity of sound in the medium 1, the values of $f$ and V become directly proportional to one another, $(f_1 \sin \alpha_1/c_1)$ then being a constant.

If the base interface 4 between the media 1 and 2 does not remain parallel to the direction of the speed $\vec{V}$, for example due to rolling or pitching motions, and takes an inclination A in relation to the direction of V, the elements 5 and 6 for transmission and reception respectively will naturally follow the movements of the base surface 4, the measured frequency $f$ will have the coefficient cos A applied to it. By way of example, for an angle of inclination A of 10°, the relative error in the measurement will be in the order of 1,5 percent. This error can be substantially reduced by making the transmission and reception elements 5 and 6 independent of the movements of the surface 4, for example by means of-stabilising these elements in relation to the vertical to the horizontal plane.

To achieve a better operational performance of this kind of acoustic transmit-receive transducer device, in particular that quality of the radiation pattern of the receiving sound transducer and to reduce the size, the receiving transducer elements 6 are arranged in an acoustic lens itself located in the casing 3 which contains the medium 1. As the medium 1 is temperature-stabilized in accordance with the dispositions taken, the resulting reception beams thus formed are themselves stabilised. Amongst other advantages, the lens presents the feature of reducing the amplitude of the secondary lobes of the radiation pattern, makes it possible to simultaneously form several beams with very little crosstallk and substantially simplifies the associated reception electronic circuits.

A device similar to that shown in FIG. 1 can also be utilised to vary the inclination of the main lobe of the radiation patterns produced by the transmitting and receiving elements 5 and 6. To do so, it is merely necessary to vary the velocity $c_1$ of propagation of ultrasonic waves in the medium 1, for example by controlled modifications of the temperature of said medium, this control being effected by an auxiliary piece of equipment not shown here.

Figure 2:
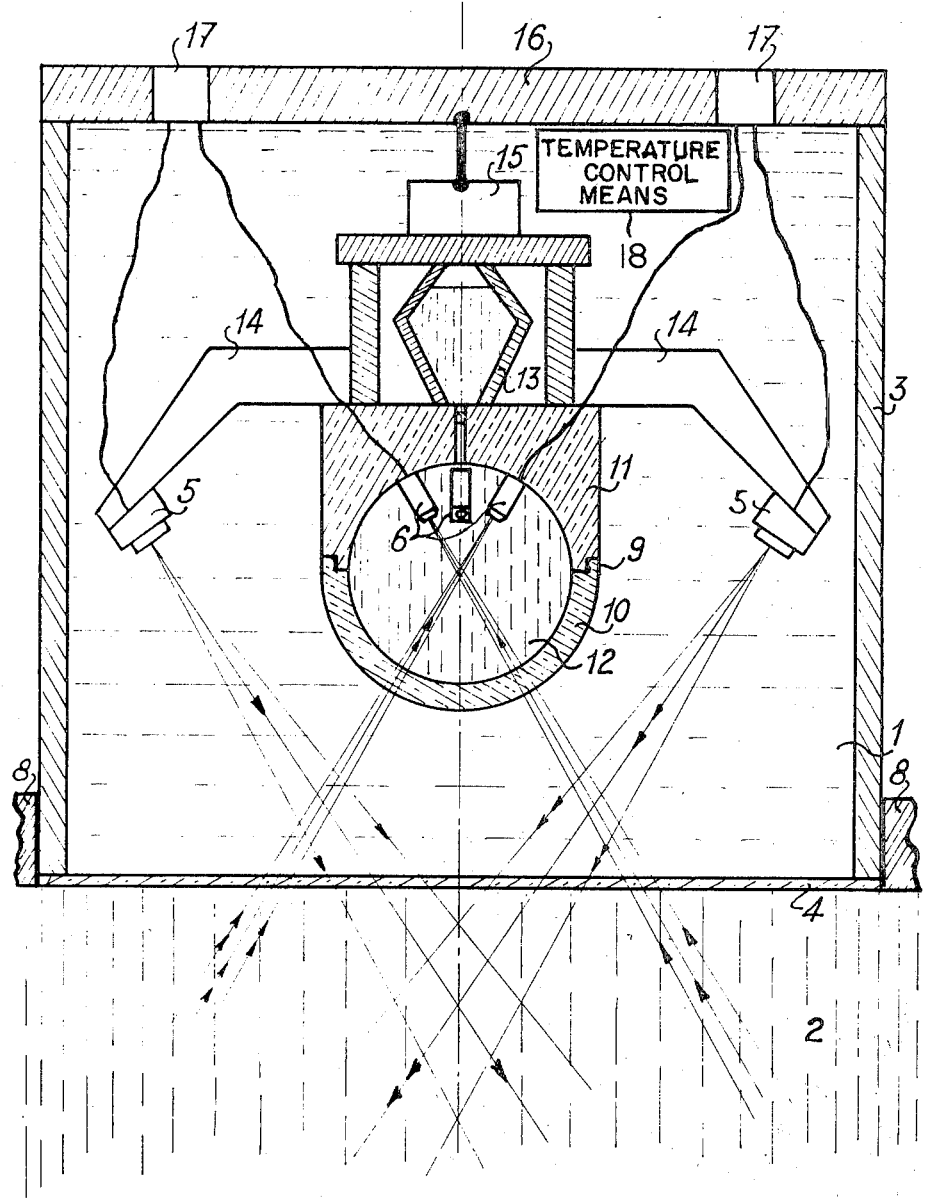
FIG. 2 is a simplified sectional view of tha acoustic sound transducer device in accordance with the invention.

FIG. 2 illustrates a diametrical section through a preferred embodiment of the acoustic transmit/receive sound transducer device implementing a system in accordance with the invention; the electronic circuits and the equipment controlling the temperature associated with this device, have not been shown since they are well-known per se.

The acoustic sound transducer device in accordance with the invention comprises a casing 3 filled with a temperature stabilised liquid 1 and containing acoustic transmitting and receiving transducer elements 5 and 6. The casing 3 is sealed and has the form of a solid of revolution about a vertical axis. It is attached rigidly to the hull 8 of a marine vessel, for example in a fashion such that its base 4 is flush with the hull exterior, the seal being produced between said hull 8 and the casing 3.

Its diameter is in the order of 150 to 200 λ, where λ is the wavelength of the emitted waves.

The base 4 of the casing 3 is formed by a diaphragm of material which is transparent to ultrasonic waves, for example synthetic rubber of the type known under the trade mark "PERBUNAN." This diaphragm will preferably be as flat and uniform as possible. To improve its mechanical stiffness, the diaphragm is provided with a stiffener system or can be arranged between two gride, the step of the stiffener system or of the grids being made greater than 10 λ so that the transparency of the diaphragm to ultrasonic waves, is not affected.

The liquid 1 filling the casing 3 is chosen so that the celerity $c_1$ of the propagated ultrasonic waves is close to that $c_2$ of the same waves in the medium 2, in this case sea water. For example, mineral oil will be chosen, for which $c_1$=1,450 m/s.

A temperature sensor, for example a platinum measuring wire resistor, and a heating resistor, both schematically indicated by block form 18 in FIG. 2, are arranged in the casing 3 in order to maintain the temperature of the oil 1 constant at for example 30°C ± 1° C.

The four receiver elements 6 are located upon the focal sphere of a acoustic spherical lens 9 itself located within the casing 3.

The internal and external diameter of said lens 9 are chosen respectively in the order of 40 λ and 50 λ. The lens is formed by two hemispheres, at least the bottom one 10 of which, is made of a material transparent to ultrasonic waves, for example such as polyurethane, the top one 11 advantageously being made of an absorbent material, such for example as rubber filled with cork particles.

It is to this top hemisphere 11 that the four receiver elements 6 are attached, in this case hydrophones arranged in two mutually perpendicular planes and inclined at the same angle in relation to the vertical. The lens 9 is filled with a liquid 12, such for example as a mixture of fluorocarbone in which the sound propagation velocity is around 800 meters per second. An expansion vassel 13, communicating through a duct with the internal part of the lens, allows this liquid 12 to expand with variations in temperature produced for example during transportation or storage of the lens.

By means of this acoustic spherical lens 9, accordingly four reception beams with aperture angles of 2° are formed in four directions inclined at 30° in relation to the vertical and passing along two mutually perpendicular planes.

As far as the corresponding emitter elements 5 are concerned, these are arranged in a horizontal plane, outside the lens 9, in directions parallel to those of the receiver elements 6 and at a distance from the diaphragm 4 of the casing 3, such that said diaphragm 4 is beyond their Fresnel zone, for example in the order of 60 λ. Their diameter is in the order of 7 λ and they are arranged upon a circle having a diameter in the order of 100 to 120 λ, i.e. so that the emitted beam, with an apperture angle about 8°, is not disturbed by the lens 9. These emitter elements are carried by arms 14 fixed to the lens.

To provide a still understanding of the embodiment described hereinbefore, the sound transducer arrangement can be briefly stated as follows:

considering two perpendicular axes, assumed to be in a horizontal plane and passing through the corners of two separate squares, the electroacoustic transmitting transducers are arranged at the respective corners of the external square and the receiving transducers i.e. hydrophones at the corners of the internal square, the transducers of adjacent corners located on one and the same axis, constituting the functional transmitter-receiver elements pair, in other words two pairs per axis.

Because of the relatively small weight and bulk of the system formed by the emitter elements 5 and the lens 9, it is possible to stabilise this transmit/receive assembly within the casing 3 in order to reduce the influence of roll and pitch movements of the vessel, upon the accuracy of measurement. This kind of stabilisation is of the mechanical pendular type, for example using a suspension system 15 with two universal joints, one in the roll axis and the other in the pitch axis, the fixed point of the suspension being located upon the cover 16 of the casing 3. The cover carries leadthroughs 17 provided for the electrical feeders linking the elements within the casing with the associated electrical equipment.

Thus, a transmit/receive sound transducer device for a Doppler sonar, has been described, which makes it possible to carry out measurement of the longitudinal and transverse speed components of the vessel to which it is fitted, such measurement being independent of variations in the velocity of the ultrasonic waves propagation through sea water and its accuracy being substantially less sensitive to the influence of rolling and pitching.

Obviously, this rolling and pitching influence can be completely removed by detaching the casing from the vessel hull and stabilising it by means of control depending on the provided data from an inertial system, but this of course correspondingly increases the complexity and cost of the system.

Another advantage of the sound transducer device described in the foregoing is that the diaphragm of the casing does not project outside the hull of the vessel to which it is fitted.

In addition, the device can comprise a mobile external shutter to protect the diaphragm 4, this shutter being retracted when the device is operating.

Of course, the invention is not limited to the embodiment described and shown which was given solely by way of example.

What is claimed is:

1. A navigation system utilising the Doppler effect for water borne vessel comprising,
   an on-board acoustic waves transmit and receive sound transducer device formed by a plurality of electroacoustic transducer elements (5; 6) associated in transmit-receive cooperating pairs,
   Doppler sonar electronic circuit means coupled to the transmit transducer elements (5) for radiating acoustic wave energy beams toward water (2) submerged bottom (7) and coupled to the receive transducer elements (6) receiving said beams energy as reflected from the said bottom discrete areas for processing return signals to derive the vessel speed ($\vec{V}$) by Doppler frequency measurement, a fluid medium (1) filled sealed casing (3) with a base (4) formed by an acoustic waves transparent diaphragm in contact with the vessel supporting water, said transmit elements and said receiving elements being located within said fluid filled casing with inclined beam axes oriented towards said diaphragm, and said fluid medium being selected with a waves propagation velocity ($c_1$) of a known value as related to the fluid temperature, said velocity being modified by associated temperature control means located within said casing.

2. A system comprising the device claimed in claim 1, wherein at least one receiving transducer element (6) is arranged within an acoustic lens assembled in said casing (3) with the associated transmitting transducer element (5).

3. A system comprising a device claimed in claim 1, improved in order to reduce the influence of rolling and pitching motions, wherein said transmit and receive transducer elements (5; 6) of the device are assembled upon a common mounting suspended from the cover (16) of the casing (3) by means of a pendular mechanical coupling (15), so that the elements are stabilised in relation to a vertical to the horizontal plane.

4. A system comprising the device claimed in claim 1, wherein said casing (3) is a closed cylinder having a diameter ranging between 150 and 200 times the wavelength $\lambda$ of the emitted waves and fixed to the hull (8) of the vessel at that of its portions closed off by the base (4) of the mechanically reinforced material transparent to the waves, the fluid medium (1) filling the casing being a liquid chosen to have a velocity of propogation ($c_1$) close to that ($c_2$) of the vessel supporting water (2), and its temperature being stabilised;

the four receivers elements (6) are arranged upon the focal sphere of a spherical acoustic lens (9) having internal diameter about 40 $\lambda$ and an external diameter about 50 $\lambda$, said lens being formed by two hemispheres (10; 11) one of which (10) is orientated towards said base transparent to the waves, and its internal part being filled with a liquid (12) with a selected waves propagation velocity communicating through a duct with an expansion vessel (13);

the four emitter elements (6) having diameters of around 7 $\lambda$, are arranged at approximately 60 $\lambda$ from said base (4) and distributed horizontally on a circle having a diameter ranging between 100 and 120 $\lambda$ and supported by arms (14) fixed to the lens, — the acoustic tranducers assembly being suspended form the cover (16) comprising lead-throughs (17) for electrical connections to the associated electronic equipment and for connections of the associated equipment controlling stabilisation of the temperature of the casing fluid medium (1).

5. A system comprising the device claimed in claim 1, wherein the radiated acoustic waves frequency ($f_1$) is maintained constant, and said fluid (1) temperature controllably modified by said temperature control means (18), whereby the velocity of propagation ($c_1$) of said waves is varied and the radiation beams inclined to the desired angle ($\alpha$) value.

6. A system comprising the device claimed in claim 1, wherein said fluid (1) temperature is maintained at a constant predetermined value by said temperature control means (18), the casing base interface (4) between said fluid and the vessel supporting water (2) being substantially parallel to the speed vector ($\vec{V}$) of the vessel, whereby the errors due to variation of velocity of propagation ($c_2$) of sound in said water are compensated.

* * * * *